United States Patent [19]

Hammer et al.

[11] 3,922,419

[45] Nov. 25, 1975

[54] MANUFACTURE OF A REINFORCED, NON-WOVEN TEXTILE FIBER SHEET MATERIAL

[75] Inventors: Klaus-Dieter Hammer, Mainz; Ludwig Klenk, Hallgarten, both of Germany

[73] Assignee: Hoechst Aktiengesellschaft, Germany

[22] Filed: Feb. 5, 1974

[21] Appl. No.: 439,739

Related U.S. Application Data

[62] Division of Ser. No. 291,323, Sept. 22, 1972, Pat. No. 3,853,608.

[30] Foreign Application Priority Data

Sept. 24, 1971 Germany............................ 2147757

[52] U.S. Cl.................... 428/198; 260/29.4 UA; 260/29.7 WA; 428/361; 428/904
[51] Int. Cl.²........................................... B32B 7/14
[58] Field of Search ........... 161/148, 157, 170, 189, 161/206, DIG. 2, 176, 169; 117/161 LN, 76 F, 140 A; 156/62.2, 62.6, 327, 329, 331; 260/29.2; 428/198, 361, 904; 206/29.4 UA, 29.7 WA

[56] References Cited
UNITED STATES PATENTS

| | | | |
|---|---|---|---|
| 3,280,214 | 10/1966 | Mitchell.......................... | 161/206 X |
| 3,322,606 | 5/1967 | Koller................................ | 161/157 |
| 3,232,819 | 2/1966 | Satas............................... | 161/157 X |
| 3,369,948 | 2/1968 | Ostmann, Jr.................... | 161/157 X |
| 3,401,078 | 9/1968 | Grossteinbeck et al. ........ | 161/157 X |
| 3,501,368 | 3/1970 | Schabert et al.................. | 161/157 X |
| 3,660,222 | 5/1972 | Fleming, Jr. et al............ | 161/157 X |
| 3,762,984 | 10/1973 | Goldbeck........................ | 161/157 X |
| 3,767,728 | 10/1973 | Langsan et al. ............... | 117/161 LN |
| 3,770,562 | 11/1973 | Newman........................ | 161/157 X |

*Primary Examiner*—William J. Van Balen
*Assistant Examiner*—Henry F. Epstein
*Attorney, Agent, or Firm*—James E. Bryan

[57] ABSTRACT

This invention relates to a random fiber sheet material having regions in which fiber cross-over points are bonded by synthetic elastomer binder, the regions being separated within the material by regions in which there is no bonding of fiber cross-over points. The invention also relates to a process for the preparation of the material.

9 Claims, 1 Drawing Figure

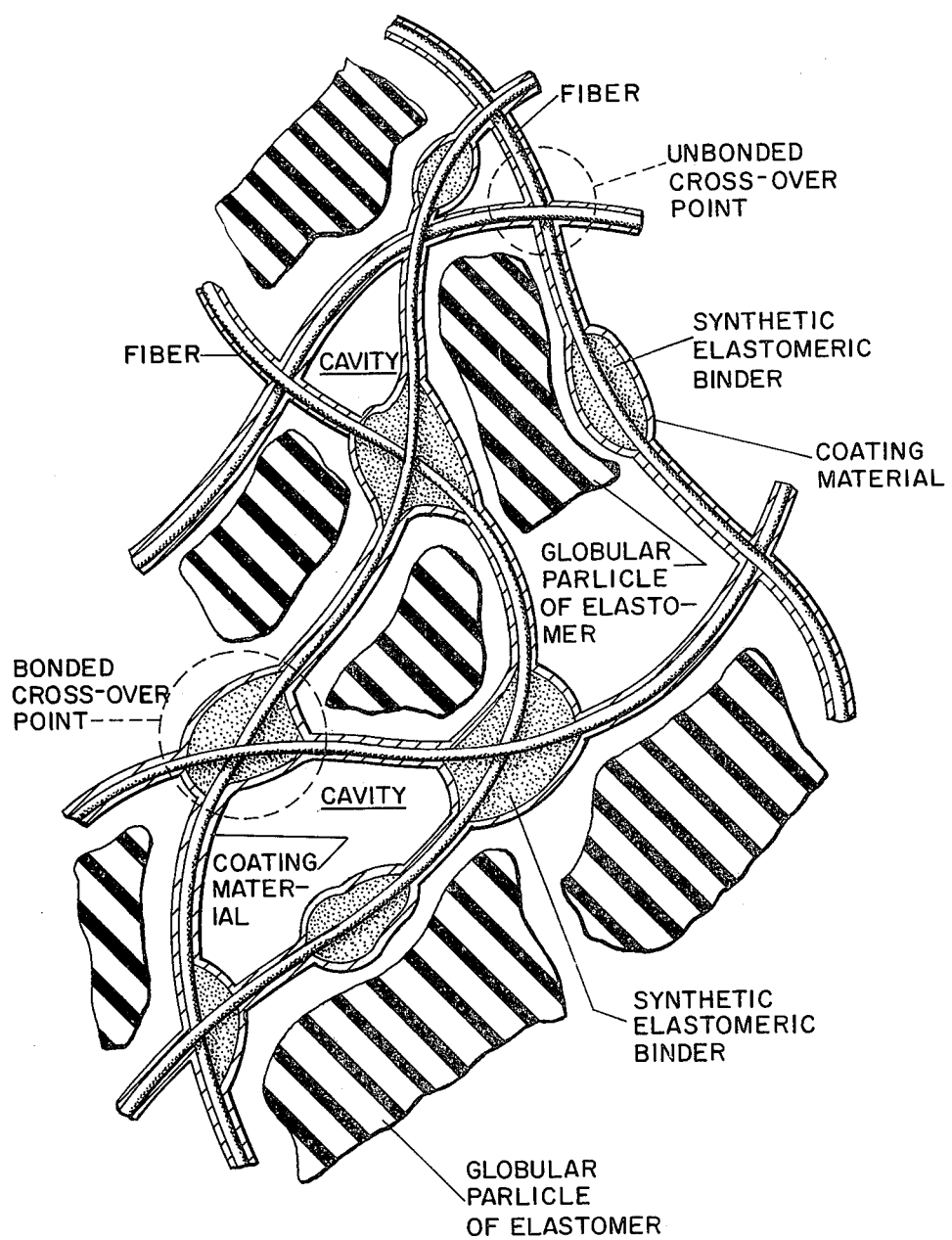

MANUFACTURE OF A REINFORCED, NON-WOVEN TEXTILE FIBER SHEET MATERIAL

This is a division of application Ser. No. 291,323, filed Sept. 22, 1972, and now U.S. Pat. No. 3,853,608.

This invention concerns a process for the manufacture of a non-woven textile fiber sheet material bonded by chemical means, which has a high tensile strength and tear propagation strength and an s-shaped course of its stress-strain diagram with a low initial modulus. Fleeces having these physical properties are particularly suitable for use as substrates for the manufacture of leather-like material for garment purposes, of material for the manufacture of handbags and the like, and for technical uses.

It is known to incorporate synthetic polymers into fiber fleeces and to reinforce the latter thereby. For this purpose, the fleeces are impregnated with solutions or dispersions of suitable elastomers and the polymer is then deposited in the fleece by coagulation. In the course thereof, the elastomer is preferentially absorbed at the cross-over points of the fibers and deposits in compact layers on the walls of the cavities of the fleece.

The known processes for bonding fleeces have the disadvantage that it is not possible reliably to avoid "excessive bonding" or "inadequate bonding" in the whole of the fleece or parts thereof. The known processes therefore give only fiber fleeces which are not entirely satisfactory as regards their mechanical properties. The stress-strain curve of the fleeces bonded in accordance with the known processes shows a positive curvature. It immediately rises rapidly, and a low initial modulus of such fleeces is not achievable by known processes. This fact is of particular disadvantage if these fleeces are further converted into leather-like material, from which, for example, shoe uppers are manufactured.

The tear propagation strength and resistance to pulling out of stitches, and the rolling and creasing behavior of fleeces manufactured according to known processes is unsatisfactory; the fleeces are hard and crinkly.

The present invention provides a process for the manufacture of a chemically bonded non-woven textile fiber sheet material, wherein a. a non-woven textile fiber sheet material is treated with a binder liquid composed of an aqueous dispersion of a synthetic elastomer containing chemically reactive groups and a solution of silicone oil in toluene,
b. the material is freed from excess of binder liquid,
c. the resulting material is subjected to the action of heat,
d. the resulting material is treated with an impregnating liquid as herein defined,
e. the material is freed from excess of impregnating liquid,
f. the resulting material is subjected to the action of heat,
g. the resulting material is treated with a liquid containing a synthetic elastomer,
h. the material is freed from excess of elastomer liquid,
i. the elastomer is deposited by coagulation in the cavities in the material, and
j. the resulting material is subjected to the action of heat for drying or drying and cross-linking of the deposited elastomer.

The resulting bonded fleece does not display the disadvantages of the known fleeces so that it is neither excessively bonded nor inadequately bonded and possesses an s-shaped course of the stress-strain curve, with low initial modulus, high tensile strength and tear propagation strength and displays the leather-like properties which are closely associated with these physical properties.

The above and other objects and advantages of the present invention will be apparent from the following detailed description when read in conjunction with the single-figure drawing, wherein an enlarged, schematic, partial cross-section of a random fiber sheet material in accordance with the present invention is illustrated.

The bonded fiber fleece of the invention is such that the binder is spatially distributed therein at centers of bonding in the form of segregated regions and the parts of the fleece lying between these regions are unbonded.

The invention accordingly, further provides a random fiber sheet material having regions in which fiber cross-over points are bonded by synthetic elastomer binder, the regions being separated within the material by regions in which there is no bonding of fiber cross-over points.

In the first series of process steps, the fleece is bonded by subjecting it to the action of a binder liquid which is composed of an aqueous dispersion of a synthetic elastomer containing reactive groups and a solution of silicone oil in toluene.

The reactive groups of the elastomeric binder enable the latter to react, under the action of heat and, advantageously, with the conjoint use of crosslinking catalysts, with chemical compounds which possess reactive groups, so as to undergo crosslinking.

The aqueous dispersion used for the manufacture of the binder liquid may have a polymeric solids content in the range of 5 to 30 percent by weight, preferably in the range of 10 to 20 percent by weight, relative to the total weight of the dispersion. The solution of silicone oil in toluene may contain 10 to 50 percent by weight of silicone oil relative to the total weight of this solution.

The binder liquid is manufactured by mixing the two above-mentioned liquids with one another. The solution of silicone oil in toluene may be added to the elastomeric dispersion in an amount in the range of 8 to 60 g, preferably 20 to 40 g, per liter of dispersion.

The dispersed phase of the aqueous dispersion is composed of a synthetic elastomer with reactive groups, especially COOH and/or $CONH_2$ and/or $-CO-N(CH_2OH)_2$ groups.

Synthetic elastomers based on acrylic copolymers are preferred, especially acrylic copolymers which are composed of 3 or 4 chemically different acrylic compounds. At the same time it is essential that the copolymers should be composed to the extent of at least 5 percent and at most 25 percent of acrylic compounds with free reactive groups. Butyl acrylate is preferred as quantitatively the main constituent of the copolymers.

Mixtures of copolymers of the specified type also can be used in the dispersed form.

A particularly preferred aqueous copolymer dispersion consists of approximately 92 percent by weight of butyl acrylate, approximately 4 percent by weight of methacrylic acid and approximately 4 percent by weight of acrylamide. The dispersion has a solids content of 40 percent by weight relative to the total weight of the dispersion.

Another preferred aqueous copolymer dispersion consists of approximately 86 percent by weight of butyl acrylate, approximately 4 percent by weight of itaconic acid, approximately 8 percent by weight of dimethylolmethacrylamide and approximately 2 percent by weight of methacrylic acid. The solids content of the dispersion is 42 percent by weight.

Apart from the synthetic elastomers based on polyacrylate which have been stated to be preferred and which function as fiber binders, it is possible to use polyurethanes or synthetic rubbers, provided that they still contain reactive groups, for example polyurethanes with free OH and/or COOH groups and/or polyurethanes which still possess reactive isocyanate groups. An example of an elastomer suitable for fiber bonding is a copolymer based on butadiene-acrylonitrile-methacrylic acid.

In the first process step, the binder liquid is allowed to act on the fiber sheet, for example by impregnating the sheet in the liquid. The impregnated fleece is thereafter freed from excess binder liquid by squeezing out, for example in the nip of a pair of rollers.

The impregnating liquid which acts on the fleece in the fourth process step contains one or more synthetic coating agents. By synthetic coating agents there are to be understood chemical compounds which are capable of forming a coating on the fiber surface which after the action of sufficient heat on the fibers coated with the agent is firmly bonded to the fiber surface as a result of the high adhesion between the fiber surface and coating caused by the action of heat.

Suitable coating agents are: ethylene ureas of the general formula

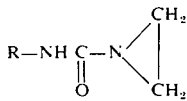

wherein R is an aliphatic chain with 14 to 22 carbon atoms, fatty amines having a carbon chain of 16 to 18 carbon atoms, paraffins, etherified fat-modified synthetic resins with side chains of between 12 and 18 carbon atoms, cross-linkable and non-cross-linkable silicones, such as, for example, dimethyl-polysiloxane and hydrogenomethyl-polysiloxane or cross-linkable polymers suitable for textile finishing, which possess perfluorinated aliphatic side chains (for example, "Scotchgard" — Registered Trade Mark of Minnesota Mining and Manufacturing Co., U.S.A). Suitable cross-linkable polymers have a perfluorinated aliphatic side chain with 6 to 14, especially 8 to 12, carbon atoms.

For example, in a cross-linkable polymer containing carboxyl groups the perfluorinated cross-linkable aliphatic side chains can be bonded to the carboxyl group of the polymer by a sulfonamide group.

The coating agent must possess the inherent properties that no, or virtually no, physical bonding forces act between adjacent surfaces of the coating and surfaces of the consolidating material, i.e., the adhesion between the surfaces is so slight that only sliding displacement of the surfaces relative to one another is possible under the action of external mechanical force on the fleece, for example on bending or stretching the fleece.

The coating agent is introduced into the fleece in the form of a liquid solution or dispersion — the impregnating liquid — by, for example, impregnating the fleece with the liquid and then expelling the solvent or dispersing agent, for example by the action of sufficient heat on the fleece. A liquor ratio in the range of 1:10 to 1:50, especially of 1:10 to 1:30, is preferred. Suitable liquids for the manufacture of a solution which contains the coating agent are those which do not have a solvent action on the fibers of the fleece, for example water.

Suitable dispersing agents for the manufacture of a liquid dispersion of a coating agent are those which do not have a solvent action on the fibers of the fleece, for example water.

The proportion of coating agent in the impregnating liquid may be in the range of 2 to 30 percent by weight relative to the total weight of the impregnating liquid, and especially in the range of 6 to 12 percent by weight.

The coating agent is to be regarded as bonded in a wash-resistant manner to the fiber surface if the adhesion between the fiber surface and the coating agent is so great that on five mechanical washes at 60°C. according to DIN 54,010 no detachment, or virtually no detachment, of the coating agent from the fiber surface occurs.

A suitable wash liquid is: 5 g/l of soap and 2 g/l of anhydrous sodium carbonate, washing time 30 minutes, 60°C., 1:50 liquor ratio.

The elastomer liquid incorporated into the fleece in the seventh process step is composed of a solution of a synthetic elastomer in an organic solvent or of an aqueous dispersion of a synthetic elastomer.

Aqueous elastomer dispersions are preferred. A suitable elastomer solution is, for example, polyurethane in dimethylformamide. An aqueous dispersion of a copolymer based on butadiene-acrylonitrile-methacrylic acid is preferred and copolymers containing approximately 64 percent by weight of butadiene, approximately 32 percent by weight of acrylonitrile and approximately 4 percent by weight of methacrylic acid, in each case relative to the total weight of the copolymer, are very particularly preferred.

The proportion of elastomer in the solution may be 20 to 40 percent by weight, relative to the total weight of the solution. The proportion of polymer in the elastomer dispersion may be 20 to 50 percent by weight, relative to the total weight of the dispersion.

Suitable non-woven textile fiber sheets are those which consist wholly or predominantly of synthetic fibers; the synthetic fiber content of the fleece can consist either of fibers which are chemically of the same nature or of a mixture of fibers of different chemical composition; for example, a random fiber fleece can be made up of 50 percent of polyester and 50 percent of polyamide fibers.

The fleece density may be in the range of 0.08 to 0.6 g/cm$^3$. Mechanical pre-consolidation and densification of the raw fleece is possible by needle-punching or by needle-punching and shrinkage, if heat-shrinkable fibers are used in the fleece. Fleece densities of between 0.3 and 0.6 g/cm$^3$ can only be brought about by subsequent calendering of the fleece at elevated temperatures.

In the case of fleeces which are used as substrates for the manufacture of leather substitutes or for textile uses, it is advisable conjointly to use a proportion (up to 50 to 60 percent) of natural fibers (cellulose or wool) or hydrophilic fibers, such as reclaimed fibers or polyvinyl alcohol fibers, in order in this way to achieve favorable physiological properties.

The original fleeces have a very flat shape of the stress-strain curve, with a low initial modulus. The course of the curve — namely initial modulus, middle section and destruction phase — can be varied within wide limits in the original fleece through the nature of the fibers chosen, their titre, the fiber orientation, the length and surface characteristics of the fibers and the density of the fleece.

In order to achieve an s-shaped course of the stress-strain curve, and high tensile strength and tear propagation strength values by chemical bonding of the fleece it is necessary to use binder liquids which have a relatively low content of fiber-binding elastomers. It is an essential condition of the process according to the invention that the aqueous binder dispersion should contain a synthetic elastomer which can be coagulated by heat.

Particularly advantageously, the binder liquid contains a chemical compound which makes it possible for the elastomer to coagulate spontaneously under the action of sufficient heat. Suitable agents which influence the ease of coagulation of the elastomer by heat are, for example, polysiloxanes.

The proportion of the fiber-bonding elastomer in the fleece according to the invention may be in the range of 5 to 30 percent by weight relative to the starting weight of the original fleece.

The action of heat on the fleece, after the latter has been treated with the binder liquid, first results in the removal of the dispersing agent and, second, in the cross-linking of the elastomer by chemical reaction via its reactive groups.

The consequence of the action of the impregnating liquid, with subsequent heat treatment of the impregnated fleece, is that on the surface of the parts of the fibers which are free from elastomeric binder, a firmly adhering coating is formed which on subsequent incorporation of elastomer into the fleece prevents the polymer of the elastomer from adhering to the fiber surfaces and to the binder; accordingly, the polymer introduced into the fleece after the impregnating process does not contribute to the bonding of the fibers but exists in the form of globular particles in the cavities of the fleece, without being bonded to the adjoining fiber surfaces.

In the fleece according to the invention, the synthetic elastomer which binds the fibers is localized in the form of a plurality of segregated regions arranged spatially relatively remote from one another in the fleece, within which regions the fibers and fiber cross-over points enclosed by the elastomer are bonded by the chemical binder while the fiber regions and fiber cross-over points located between the segregated binder regions are not bonded.

In contrast to known chemically bonded fleeces in which the chemical binder is distributed normally at random in the fleece, the fleece according to the invention is distinguished by segregated regions of binder; the overall structure of the binder in the fleece can be described as honeycomb-like.

The result of the first series of process steps is that the desired distribution of the chemical binder in the fleece is achieved. The coagulation conditions of the elastomeric binder should be so chosen that spontaneous coagulation occurs only after the elastomer dispersion has spread horizontally in the fleece and before migration of the dispersion at right angles to the horizontal plane commences. The appropriate coagulation conditions can be determined by simple preliminary experiments in each individual case.

During the course of the first series of process steps, the desired distribution of the chemical binder in the fleece is achieved. As a result of the deposition of the chemical binder in the form of a plurality of spaced regions within the fleece and as a result of cross-linking of the chemical binder, the fleece becomes reinforced only within the stated regions by relatively large binder particles. When arranged in this way in the fleece, the chemical binder is very much more effective than in the case of diffuse distribution, with small binder particles distributed essentially at random over the cross-section of the fleece. The highest bonding strength is achieved when the adhesion of the binder to the fibers and the cohesion of the binder differ as little as possible from the fiber strength.

The concentration and the amount of the silicone oil solution in aromatic solvents, and the coagulation conditions for precipitating the elastomeric binder from the binder liquid must be suited to the particular binder concentration in the binder liquid and to the binder type. The above-mentioned conditions must at the same time be so chosen that the particular binder concentration gives an optimum as regards "mesh width", i.e., as regards the spacing of the individual regions containing binder. It easily can be seen that for an increasing binder concentration (increasing binder content of the fleece) the "mesh width" of the bonded fiber cross-over points in the fleece must decrease. Thus if the fleece density remains the same and the type of binder remains the same, harder types of fleece, with a steep course of the stress-strain curve, increasing tensile strength and decreasing tear propagation strength are obtained as the binder concentration increases.

The mechanical properties of the fleece as a result already can be determined after the preliminary bonding according to the process steps (a) to (c).

In particular, it is advantageous to select the use of a suitable combination of fleece density and optimum binder concentration. For each fleece density, only a very particular binder concentration (a very particular binder content) can be used to give effectively the optimum "mesh width."

The development of the honeycomb structure of the binder in the fleece can be intensified by increasing the concentration of the silicone oil solution in the aromatic solvent, which is added to the elastomer dispersion or elastomer solution.

Depending on the density of the fleece, the proportion of the synthetic elastomer embedded in the fleece and not contributing to fiber bonding is 10 to 50 percent by weight relative to the bonded and impregnated fleece.

The above-mentioned amount of synthetic elastomer embedded in the fleece and not contributing to fiber bonding ensures that the flat initial course of the stress-strain curve of the fleece is not adversely influenced. The synthetic elastomer embedded in the manner of a filler merely influences the length of the initial part of the stress-strain curve of the fleece and the slope of the middle part of this curve.

The performance of the process is described below.

A random fiber sheet based on synthetic fibers is impregnated with binder liquid and is thereafter freed from excess of binder liquid, for example by expressing the fleece web in the nip of a pair of rollers. Thereafter, the fleece is sufficiently heated at a temperature of 120° to 180°C for a period in the range of 30 seconds to 30 minutes to initiate the coagulation and expel the liquid volatile constituent of the binder liquid, and to cross-link the elastomeric binder.

Thereafter, the bonded fleece is subjected to the action of an impregnating liquid, for example by immersing the fleece in this liquid. The impregnated fleece is then freed from excess of impregnating liquid, for example by expressing in the nip of a pair of rollers. The impregnated fleece is then heated at a temperature in the range of 100° to 170°C for a period in the range of 30 seconds to 15 minutes, as a result of which the fleece is dried and the impregnating agent is cross-linked to give a coating which adheres firmly to the surfaces of the fiber which are free from elastomeric binder and on the binder.

Thereafter, synthetic elastomer is embedded in the cavities of the impregnated fleece, without adhering to the fibers, by treating the fleece with a polymer solution or polymer dispersion, for example by impregnating the fleece therewith, freeing the fleece from excess of polymer liquid, for example by expressing the fleece in the nip of a pair of rollers, and subjecting the fleece to sufficient heat to cause the precipitation of the elastomer in the form of globular particles in the cavities of the fleece. The coagulation temperature is roughly in the region of 40°C.

After the elastomer has been coagulated, the liquid still contained in the fleece is expelled, for example by drying the fleece in a tenter frame drier at a temperature which suffices to expel the volatile constituents, for example 100° to 120°C. The fleece is then subjected to a temperature in the range of 120° to 180°C for a period of 5 to 30 minutes, and is thereby vulcanized.

The process described advantageously influences and adjusts a whole series of closely related properties which are not achievable by the known processes. It is possible largely to influence the mechanical properties of the bonded fleeces. This is possible because there are many possible variants of the process, which will be briefly indicated:

In the original fleece, the composition, orientation, length and titre of the fibers and the density of the fleece can be varied. Furthermore, the type, amount and "mesh width" of the binder, the substance used as the finish and the amount applied, and also the amount and type of the filler, can be chosen as desired. In the case of the filler, prime factors are the plastic-elastic and the physiological-hygienic properties.

The complicated structure of the material necessary to produce the required mechanical properties can be achieved by very simple process steps. The properties concerned are the following mechanical leather-like properties:

The most important characteristic is an s-shaped course of the stress-strain curve, with a low initial modulus. This curve can be adjusted as desired. It is an important pre-requisite that the starting fleece should be isotropic over its surface. Such a characteristic shape of the curve cannot be achieved by any of the previous methods of bonding. The important property of suppleness depends on this course of the curve. A material can be described as supple if, when stressed mechanically, it can easily give to a slight stress (flat initial course and low initial modulus) while it offers increasing resistance to a greater stress (steep middle part of the curve). A steep initial course of the curve, i.e., a positive curvature, was hitherto the decisive disadvantage of all synthetic leathers and the reason why shoes made of this material did not "wear in." All other mechanical leather-like properties are closely related to the s-shaped course of the curve: a high tear propagation strength is achievable because the force which is applied is transferred to the consolidated fiber network and is reduced by a slight deformation of this network. The tensile strength is very high because the closely delineated bonded regions are vry strong. A permanent surface stretching now also becomes possible, and this depends on the filler content. The stretching can be matched to the type of leather that it is desired to simulate. The rolling and creasing behavior is very leather-like since the reinforced fiber network and the filler can move independently of one another. As a result of this double bonding process, the differences in density of the fleece are also completely compensated since the binder is drawn into the regions where there is a high density of fibrs while the filler is repelled, by the finish, into the regions where there is a low fiber density. It can be appreciated that both a leather substitute and a textile material can be obtained, as desired, by simple measures, and that these materials have hitherto unattainable mechanical properties.

The following Examples further illustrate the invention:

EXAMPLE 1

A random fiber fleece of 50 percent of polyester fibers and 50 percent of polyamide fibers — staple length 30 mm, titre 1.3 dtex — which has a density of 0.15 g/cm$^3$, a tensile strength of 0.4 kp/mm$^2$ (DIN 53,328) and a tear propagation strength of 8.5 kp/mm (according to IUP 8) is impregnated with a binder liquid of the following composition:

500 g of a 40 percent by weight aqueous dispersion of a copolymer of the following composition:
  92 percent by weight of butyl acrylate, 4 percent by weight of methacrylic acid, and 4 percent by weight of acrylamide
500 g of H$_2$O
22.4 g of polysiloxane (for example Coagulant WS of Farbenfabriken Bayer), and
33 g of a 15 percent by weight solution of silicone oil in toluene (for example Silicone Oil AL of Wacker-Chemie)

in a trough filled with this liquid, withdrawn from this trough and freed from excess of liquid by squeezing out in the nip of a pair of rollers.

The fleece is then heated at 180°C for a period of 3 minutes, by radiation from an infra-red radiator.

The bonded fleece is then impregnated in an impregnating bath containing 100 g of dimethylpolysiloxane (for example "Primenit" SW of Farbwerke Hoechst AG) per liter of liquor. The fleece is impregnated with the impregnating liquor on a Foulard machine.

After removing the impregnated fleece from the impregnating liquor, the excess of impregnating liquid is expressed from the fleece in the nip of a pair of rollers and the fleece is then dried in a tenter frame drier at 100° to 150°C and subsequently heated in this drier at 170°C. for a period of 30 seconds.

The impregnated fleece is then dipped in an aqueous dispersion of a copolymer consisting of 64 percent by weight of butadiene, 32 percent by weight of acrylonitrile and 4 percent by weight of methacrylic acid (for example "Perbunan" NT of Farbenfabriken Bayer), withdrawn from the impregnating bath and then freed from excess of dispersion by expressing in the nip of a pair of rollers. The elastomer is then coagulated on the fleece by heat from an infra-red radiator. The coagulation temperature is 30°C.

Thereafter, the fleece is dried in a tenter frame drier at 100°C and is then heated at a temperature of 160°C for 5 minutes. This heat treatment vulcanizes and cross-links the elastomer.

The fleece is soft and supple and can be used as a substrate for the manufacture of a synthetic material having properties resembling box calf. The fleece has the following characteristics:

| | |
|---|---|
| Total elastomer content | 45% by weight relative to the total weight of the fleece |
| Tensile strength | 1.4 kp/mm$^2$ |
| Tear propagation strength | 12 kp/mm |
| Force required for 5% elongation | 0.05 kp/mm$^2$ |

EXAMPLE 2

As Example 1, except that instead of the aqueous copolymer dispersion mentioned in Example 1, a copolymer dispersion of the composition shown below is employed as constituent of the binder liquid:

500 g of a 40 percent by weight aqueous copolymer dispersion of the following composition:
86% by weight of butyl acrylate, 4 percent by weight of itaconic acid, 8 percent by weight of dimethylolmethacrylic acid amide and 2 percent by weight of methacrylic acid.

EXAMPLE 3

A random fiber fleece according to Example 1, of density 0.18 g/cm$^3$, is treated with a binder liquid of the following composition:

400 g of a 40 percent by weight copolymer dispersion of the following composition:
92 percent by weight of butyl acrylate, 4 percent by weight of methacrylic acid, and 4 percent by weight of acrylamide
600 g of H$_2$O
28 g of polysiloxane (for example Coagulant WS of Farbenfabriken Bayer) and
28 g of a 15 percent by weight solution of silicone oil in toluene (for example Silicone Oil AL of Wacker-Chemie)

by immersion in a bath consisting of this liquid, the further steps leading to fiber bonding being as in Example 1.

The impregnating step is carried out as described in Example 1, except that the impregnating liquid is an aqueous liquid which contains 80 g/l of cross-linkable silicone (for example "Akophob" SN of Farbwerke Hoechst AG).

The impregnated fleece is further treated as indicated in Example 1 and there is incorporated an aqueous elastomer dispersion of the following composition:
100 g of a copolymer consisting of 64 percent by weight of butadiene, 32 percent by weight of acrylonitrile and 4 percent by weight of methacrylic acid (for example "Perbunan" NT of Farbenfabriken Bayer)
1.5 g of an emulsifier (for example "Emulvin", 26 percent concentration, of Farbenfabriken Bayer)
16.5 g of H$_2$O
0.1 g of colloidal sulfur
7.15 g of 32 percent concentration ZnO
0.1 g of vulcanizing agent "Vulkazit" LDA, a product of Farbenfabriken Bayer
0.75 g of vulcanizing agent "Vulkazit" ZU also a product of Farbenfabriken Bayer
2.5 g of titanium dioxide
0.6 g of an emulsifier (for example "Emulvin," 40 percent concentration, of Farbenfabriken Bayer)
29.1 g of octadecyl-ethylene urea (for example "Primenit" LD of Farbwerke Hoechst AG)
2.5 g of polyvinyl alcohol (for example "Mowiol" N 70 – 88 of Farbwerke Hoechst AG)
75 g of H$_2$O
1.65 g of an emulsifier
0.4 g of polysiloxane (for example Coagulant WS)
0.54 g of dyestuff and
0.75 g of sodium chloride.

When the fleece has been impregnated in this liquid, it is withdrawn and the excess of liquid is expressed in the nip of a pair of rollers. The fleece is then subjected to the radiation of an infrared radiator and the elastomer in the fleece is thereby coagulated (coagulation temperature 38°C). Thereafter the fleece is dried in a tenter frame drier and is then heat-treated for 5 minutes at 160°C, whereby the elastomer is cross-linked.

The fleece produced can be used as a substrate for a synthetic leather substitute having properties resembling soft cowhide.

The fleece has a total elastomer content of 48 percent by weight relative to the total weight of the fleece, a tensile strength of 1.6 kp/mm$^2$, a tear propagation strength of 10 kg/mm and a force required for 5 percent elongation of 0.06 kp/mm$^2$.

EXAMPLE 4

A random fiber fleece of the composition described in Example 1, having a density of 0.28 g/cm$^3$, is bonded in the manner described in Example 1 except that the binder dispersion has the following composition:

500 g of a 40 percent by weight aqueous dispersion of a copolymer of the following composition:
92 percent by weight of butyl acrylate, 4 percent by weight of methacrylic acid and 4 percent by weight of acrylamide
800 g of H$_2$O
18.4 g of polysiloxane (for example Coagulant WS of Farbenfabriken Bayer) and
16 g of a 15 percent by weight solution of silicone oil in toluene (for example Silicone Oil AL of Wacker-Chemie).

The impregnating step is carried out as in Example 2, using an aqueous liquor of the following composition:
40 g/l of melamine-formaldehyde precondensate (for example "Cassurit" MLP of Farbwerke Cassella, Frankfurt/M., Mainkur)
5 g/l of MgCl$_2$
12 g/l of a synthetic perfluorinated compound (for example "Oleophobol" FC 218 of Chemische Fabrik Pfersee).

The fleece is impregnated, expressed and dried and is then heat-treated for 2 minutes at 150°C in a tenter frame drier.

The method described in Example 1 applies to the incorporation of the elastomer into the fleece.

The fleece produced can be used as a substrate for a synthetic leather substitute having properties resembling hard cowhide.

| | |
|---|---|
| Total elastomer content | 30% by weight relative to the total weight of the fleece |
| Tensile strength | 1.9 kp/mm$^2$ |
| Tear propagation strength | 14 kp/mm |
| Force required for 5% elongation | 0.08 kp/mm$^2$ |

EXAMPLE 5

As described in Example 1 except that the random fiber fleece has a density of 0.2 g/cm$^3$ and the binder liquid has the following composition:
- 24.25 g of a 40 percent by weight aqueous dispersion of a copolymer of the following composition:
  - 92 percent by weight of butyl acrylate, 4 percent by weight of methacrylic acid, 4 percent by weight of acrylamide
- 72.75 g of H$_2$O
- 1.0 g of magnesium chloride
- 2.0 g of melamine-formaldehyde precondensate, 50 percent by weight aqueous solution
- 2.4 g of a 20 percent by weight solution of silicone oil in toluene (for example Silicone Oil AL of Wacker-Chemie), and
- 2.4 g of polysiloxane (for example Coagulant WS of Farbenfabriken Bayer).

The impregnation of the fleece and the incorporation of the elastomer into the cavities of the fleece are carried out in the manner described in Example 1.

The fleece produced is suitable for use as a substrate for the manufacture of a synthetic material having leather-like properties of the type of soft cowhide.

| | |
|---|---|
| Total elastomer content | 35% by weight relative to the total weight of the fleece |
| Tensile strength | 2.0 kp/mm$^2$ |
| Tear propagation strength | 12 kp/mm |
| Force required for 5% elongation | 0.05 kp/mm$^2$ |

EXAMPLE 6

As described in Example 1, except that the random fiber fleece has a density of 0.14 g/cm$^3$ and the binder liquid has the following composition:
- 360 g of a 40 percent by weight aqueous dispersion of a copolymer of the following composition:
  - 92 percent by weight of butyl acrylate, 4 percent by weight of methacrylic acid, and 4 percent by weight of acrylamide
- 540 g of H$_2$O
- 20 g of magnesium chloride
- 80 g of a melamine-formaldehyde precondensate, 50 percent by weight solution
- 23 g of a 12 percent by weight solution of silicone oil in toluene (for example 10 percent Silicone Oil of Wacker-Chemie), and
- 23 g of polysiloxane (for example Coagulant WS of Farbenfabriken Bayer).

The impregnation of the fleece and the incorporation of the elastomer into the cavities of the fleece are carried out in the manner indicated in Example 1.

| | |
|---|---|
| Total elastomer content | 42% by weight relative to the total weight of the fleece |
| Tensile strength | 1.4 kp/mm$^2$ |
| Tear propagation strength | 10 kp/mm |
| Force required for 5% elongation | 0.03 kp/mm$^2$ |

This fleece is split, parallel to the plane of the fleece, into 300 to 400$\mu$ thick layers. The split layers can be used as a garment material. On laminating a polyurethane film 80 to 100$\mu$ thick to the surface of a split fleece, a synthetic laminate having leather-like properties is obtained, which can be employed in clothing production.

EXAMPLE 7

A polyester spun fleece of density 0.54 g/cm$^3$ (filament titre 8 dtex) is bonded in the manner described in Example 1, with binder liquid of the following composition:
- 360 g of a 40 percent by weight aqueous dispersion of a copolymer of the following structure:
  - 92 percent by weight of butyl acrylate, 4 percent by weight of methacrylic acid, and 4 percent by weight of acrylamide
- 540 g of H$_2$O
- 80 g of melamine-formaldehyde precondensate
- 20 g of magnesium chloride
- 23 g of a 15 percent by weight solution of silicone oil in toluene, and
- 23 g of polysiloxane.

The fleece is impregnated in the manner indicated in Example 1.

However, in contrast to Example 1, no elastomer is incorporated into the bonded and impregnated fleece. The fleece is split into individual layers parallel to the plane of the fleece. The layers have a weight per unit area of approximately 100 g/m$^2$.

The tensile strength of such a layer is 1.4 kp/mm$^2$ and the tear propagation strength is 9 kp/mm.

It will be obvious to those skilled in the art that many modifications may be made within the scope of the present invention without departing from the spirit thereof, and the invention includes all such modifications.

What is claimed is:

1. A random fiber sheet material comprising a random fiber arrangement having a plurality of fiber cross-over points, a synthetic elastomer binder composed of an aqueous dispersion of a synthetic elastomer containing chemically reactive groups and a solution of silicone oil in toluene disposed on said fibers and bonding said fiber cross-over points in a plurality of bonded first regions of said sheet material separated by a plurality of non-bonded second regions of said sheet material having substantially no binder disposed on said fibers and said fiber cross-over points, a coating material disposed both on the surface of said binder in said bonded first regions of said sheet material and also on the surface of said fibers and fiber cross-over points in said unbonded second regions of said sheet material, said sheet material having a plurality of cavities between said coated surfaces and an elastomer material in the form of globular particles disposed in said cavities and substantially unbonded to said coating material in said bonded first and nonbonded second regions of said sheet material.

2. A material as claimed in claim 1 in which the binder is an aqueous dispersion of a copolymer of 92 percent by weight of butyl acrylate, 4 percent by weight of methacrylic acid and 4 percent by weight of acrylamide.

3. A material as claimed in claim 1 in which the binder is an aqueous dispersion of a copolymer of 86 percent by weight of butyl acrylate, 4 percent by weight of itaconic acid, 8 percent by weight of dimethylolmethacrylic acid and 2 percent by weight of methacrylic acid.

4. A material as claimed in claim 1 in which the coating is a cross-linked dimethylpolysiloxane.

5. A material as claimed in claim 1 in which the coating is composed of a cross-linking product of melamine-formaldehyde precondensate and a synthetic perfluorinated compound.

6. A material as claimed in claim 1 in which the elastomer contained in the cavities in the sheet is a copolymer based on butadiene-acrylonitrile-methacrylic acid.

7. A material as claimed in claim 1 in which the elastomer contained in the cavities in the sheet is a copolymer of approximately 64 percent by weight of butadiene, approximately 32 percent by weight of acrylonitrile and approximately 4 percent by weight of methacrylic acid.

8. A material as claimed in claim 2 in which the elastomer in the cavities in the sheet is a polyurethane.

9. A synthetic material possessing leather-like surface properties bonded to a substrate composed of the random sheet material of claim 1.

* * * * *